United States Patent
Umezu et al.

(10) Patent No.: US 12,437,378 B2
(45) Date of Patent: Oct. 7, 2025

(54) IMAGE PROCESSING DEVICE, IMAGE PROCESSING METHOD, PROGRAM, AND IMAGE PROCESSING SYSTEM

(71) Applicant: Socionext Inc., Kanagawa (JP)

(72) Inventors: Yuji Umezu, Yokohama (JP); Soichi Hagiwara, Yokohama (JP); Junzo Sakurai, Yokohama (JP)

(73) Assignee: SOCIONEXT INC., Kanagawa (JP)

( * ) Notice: Subject to any disclaimer, the term of this patent is extended or adjusted under 35 U.S.C. 154(b) by 324 days.

(21) Appl. No.: 18/317,599

(22) Filed: May 15, 2023

(65) Prior Publication Data

US 2023/0289938 A1   Sep. 14, 2023

Related U.S. Application Data

(63) Continuation of application No. PCT/JP2020/042934, filed on Nov. 18, 2020.

(51) Int. Cl.
  *G06T 5/94* (2024.01)
  *G06T 5/50* (2006.01)
  *G06T 7/00* (2017.01)

(52) U.S. Cl.
  CPC ............ *G06T 5/94* (2024.01); *G06T 5/50* (2013.01); *G06T 7/0002* (2013.01); *G06T 2207/30168* (2013.01); *G06T 2207/30252* (2013.01)

(58) Field of Classification Search
  CPC ........... G06T 5/94; G06T 5/50; G06T 7/0002; G06T 2207/30168; G06T 2207/30252; G06T 2207/10021; G06T 2207/10024; G06T 2207/20208; H04N 23/70; H04N 7/18; H04N 23/60
  See application file for complete search history.

(56) References Cited

U.S. PATENT DOCUMENTS

| | | | | |
|---|---|---|---|---|
| 6,222,457 | B1 * | 4/2001 | Mills | B60D 1/36 340/687 |
| 9,524,438 | B2 * | 12/2016 | Wedajo | G06V 20/56 |
| 10,791,281 | B1 * | 9/2020 | Liao | H04N 23/74 |
| 10,972,638 | B1 * | 4/2021 | Waschura | G01S 17/931 |
| 11,043,191 | B1 * | 6/2021 | Kang | G09G 5/10 |
| 2002/0012047 | A1 | 1/2002 | Imoto | |

(Continued)

FOREIGN PATENT DOCUMENTS

| | | |
|---|---|---|
| JP | 2002-036952 A | 2/2002 |
| JP | 2006-339994 A | 12/2006 |

(Continued)

OTHER PUBLICATIONS

Author Unknown, "Diffuser (optics)", Wikipedia, Version dated Aug. 5, 2020 (Year: 2020).*

(Continued)

*Primary Examiner* — Aaron W Carter
(74) *Attorney, Agent, or Firm* — Rimon P.C.

(57) ABSTRACT

An image processing device includes a memory and a processor configured to execute: obtaining a first image captured by an imaging device installed on a mobile object; generating a second image in which brightness of a second area located below a first area of the first image in a vertical direction with respect to a traveling surface of the mobile object, is corrected based on brightness of the first area; and outputting the second image.

7 Claims, 10 Drawing Sheets

(56) References Cited

U.S. PATENT DOCUMENTS

| | | | | |
|---|---|---|---|---|
| 2003/0067693 | A1 | 4/2003 | Imoto | |
| 2006/0159309 | A1* | 7/2006 | Tsukamoto | B60Q 1/1423 382/104 |
| 2006/0244844 | A1* | 11/2006 | Oizumi | H04N 23/76 348/E5.041 |
| 2008/0278632 | A1* | 11/2008 | Morimoto | H04N 1/4072 348/E5.119 |
| 2008/0309517 | A1* | 12/2008 | Saito | H04N 23/70 340/937 |
| 2009/0080794 | A1* | 3/2009 | Amano | G06T 5/92 382/274 |
| 2009/0184845 | A1* | 7/2009 | Saito | G06V 20/58 340/937 |
| 2010/0079612 | A1 | 4/2010 | Kimura | |
| 2012/0026333 | A1* | 2/2012 | Okuyama | B60R 1/28 348/148 |
| 2012/0188373 | A1* | 7/2012 | Kwon | G06T 7/11 348/148 |
| 2012/0207348 | A1* | 8/2012 | Saito | G06V 10/25 382/103 |
| 2012/0229681 | A1* | 9/2012 | Ansfield | H04N 5/2621 348/241 |
| 2013/0271608 | A1* | 10/2013 | Hiei | H04N 23/63 348/148 |
| 2014/0111637 | A1* | 4/2014 | Zhang | B60R 1/088 348/118 |
| 2014/0184798 | A1* | 7/2014 | Wedajo | G06V 20/56 348/148 |
| 2014/0354811 | A1* | 12/2014 | Weber | B60R 1/23 348/148 |
| 2015/0248771 | A1* | 9/2015 | Kim | G06T 7/12 382/173 |
| 2015/0325179 | A1* | 11/2015 | Shibamiya | G09G 3/3426 345/102 |
| 2015/0360612 | A1* | 12/2015 | Lee | B60R 1/27 348/148 |
| 2016/0162741 | A1* | 6/2016 | Shin | G06V 20/56 382/104 |
| 2017/0214851 | A1* | 7/2017 | Matsumoto | G02B 7/021 |
| 2017/0270381 | A1* | 9/2017 | Itoh | H04N 25/704 |
| 2018/0137375 | A1* | 5/2018 | Takemura | H04N 23/75 |
| 2018/0246521 | A1* | 8/2018 | Seo | H04N 23/741 |
| 2018/0257570 | A1* | 9/2018 | Kaino | G08G 1/167 |
| 2019/0113197 | A1* | 4/2019 | Kamiya | F21S 43/14 |
| 2019/0294899 | A1* | 9/2019 | Okubo | G06T 7/593 |
| 2020/0051222 | A1* | 2/2020 | Kim | H04N 23/698 |
| 2020/0290440 | A1* | 9/2020 | Ma | B60J 1/02 |
| 2021/0105402 | A1* | 4/2021 | Yamamoto | G06T 5/92 |
| 2021/0160432 | A1* | 5/2021 | Yamamoto | B60R 1/27 |
| 2022/0191449 | A1 | 6/2022 | Matsubara | |
| 2022/0268418 | A1* | 8/2022 | Park | F21S 43/40 |
| 2022/0277568 | A1* | 9/2022 | Takahashi | B60K 35/50 |
| 2022/0292686 | A1* | 9/2022 | Yasui | G06V 40/103 |
| 2023/0061733 | A1* | 3/2023 | Xie | G02B 27/0101 |
| 2023/0154373 | A1* | 5/2023 | Lin | G09G 3/32 345/690 |
| 2023/0289938 | A1* | 9/2023 | Umezu | G06T 5/50 |
| 2024/0093845 | A1* | 3/2024 | Mazuir | B60Q 1/0052 |
| 2024/0104703 | A1* | 3/2024 | Ji | G06T 5/77 |
| 2024/0331241 | A1* | 10/2024 | Akaizawa | B60R 1/27 |
| 2024/0331347 | A1* | 10/2024 | Watanabe | G06V 10/60 |
| 2025/0086835 | A1* | 3/2025 | Dong | G06T 7/33 |

FOREIGN PATENT DOCUMENTS

| | | |
|---|---|---|
| JP | 2009-201019 A | 9/2009 |
| JP | 2010-073009 A | 4/2010 |
| JP | 2010-135946 A | 6/2010 |
| JP | 2011-055437 A | 3/2011 |
| JP | 2013-074493 A | 4/2013 |
| JP | 2019-029851 A | 2/2019 |
| JP | 2020-162013 A | 10/2020 |

OTHER PUBLICATIONS

International Search Report (ISR) dated Feb. 2, 2021 issued in International Patent Application No. PCT/JP2020/042934, with English translation.

Written Opinion of the International Searching Authority dated Feb. 2, 2021 issued in International Patent Application No. PCT/JP2020/042934, with English translation of the relevant part.

Notice of Reasons for Refusal dated Jan. 21, 2025 issued in the corresponding Japanese Patent Application No. 2022-563300, with English translation.

* cited by examiner

IMAGE PROCESSING DEVICE, IMAGE PROCESSING METHOD, PROGRAM, AND IMAGE PROCESSING SYSTEM

CROSS-REFERENCE TO RELATED APPLICATIONS

This U.S. non-provisional application is a continuation application of and claims the benefit of priority under 35 U.S.C. § 365(c) from PCT International Application PCT/JP2020/042934 filed on Nov. 18, 2020, which is designated the U.S., the entire contents of which are incorporated herein by reference.

TECHNICAL FIELD

The present disclosure relates to an image processing device, an image processing method, a program, and an image processing system.

BACKGROUND ART

Conventionally, techniques of displaying images in rear of and around a vehicle on a display unit or the like of a navigation device, based on images captured by an in-vehicle camera, have been known. These are also called, for example, a back monitor and an around-view monitor, respectively.

In addition, conventionally, techniques for executing driving assistance and automatic driving based on images captured by an in-vehicle camera, have been known.

RELATED ART DOCUMENTS

Patent Documents

[Patent Document 1] Japanese Laid-Open Patent Application No. 2011-055437

However, in the conventional techniques, in the case where a light source is present in part of an angle of view of a camera as the vehicle is traveling under a street lamp at night or the like, in some cases, halation (flare or ghost) occurs.

SUMMARY

According to one aspect in the present disclosure, an image processing device includes a memory and a processor configured to execute: obtaining a first image captured by an imaging device installed on a mobile object; generating a second image in which brightness of a second area located below a first area of the first image in a vertical direction with respect to a traveling surface of the mobile object is corrected based on brightness of the first area; and outputting the second image.

EMBODIMENTS FOR CARRYING OUT THE INVENTION

In the following, embodiments in the present disclosure will be described with reference to the drawings.

According to one aspect, the brightness of frames can be corrected appropriately.

<Overall Configuration>

Figure 1:
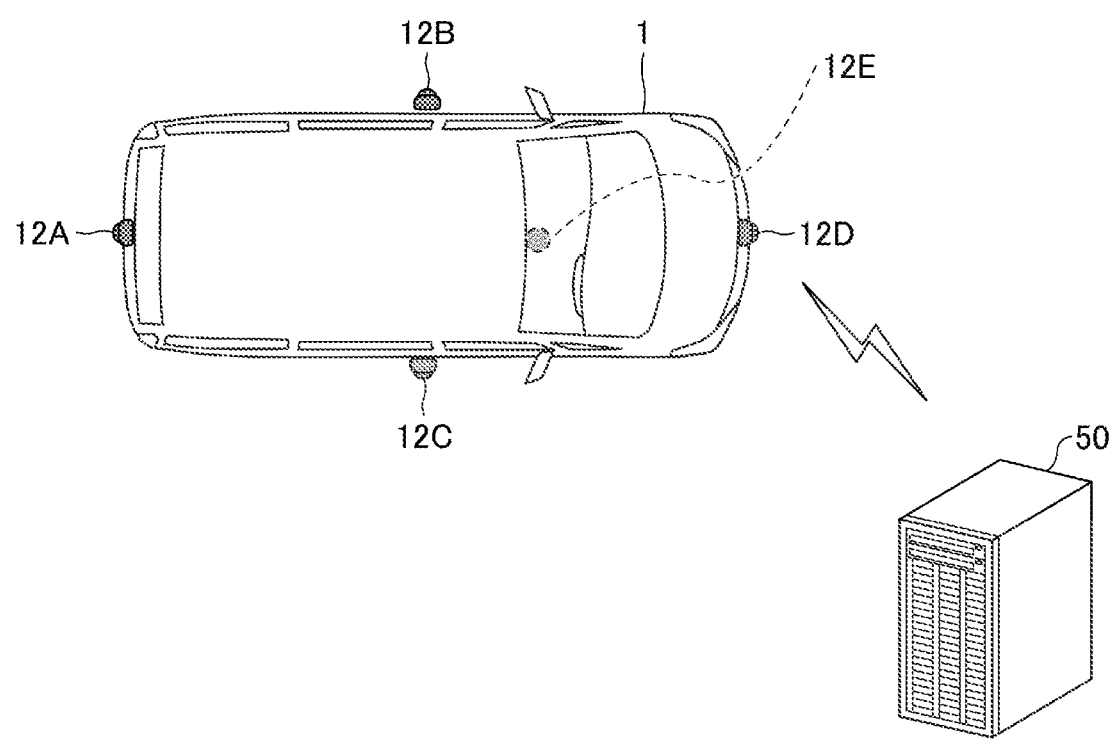
FIG. 1 is a diagram illustrating a configuration of a control system according to an embodiment.

FIG. 1 is a diagram illustrating a configuration of a control system 500 according to an embodiment. In the example in FIG. 1, the control system 500 includes a mobile object 1 and a server 50. The numbers of mobile objects 1 and servers 50 are not limited as in the example in FIG. 1.

The mobile object 1 and the server 50 communicate with each other via networks including mobile telephone networks such as 5G (5th Generation, fifth generation mobile communication system), 4G, LTE (Long Term Evolution), and 3G; wireless LANs (Local Area Networks); the Internet; and the like.

The mobile object 1 is, for example, a traveling machine such as a vehicle traveling on land by wheels, a robot traveling by legs or the like, an aircraft, an unmanned aircraft (drone), or the like. Note that the vehicle includes, for example, automobiles, motorcycles (motorbikes), robots that travel on wheels, railcars that travel on railways, and the like. Note that the automobile includes an automobile traveling on a road, a streetcar, a construction vehicle used for construction, a military vehicle for military use, an industrial vehicle for cargo handling, an agricultural vehicle, and the like.

The server 50 provides the mobile object 1 with various services, for example, necessary for automatic driving or the like of the mobile object 1.

<<Arrangement Example of Imaging Devices>>

In FIG. 1, an appearance of the mobile object 1, which is an automobile, as viewed from directly above is illustrated. In the example in FIG. 1, the mobile object 1 includes an imaging device 12A, an imaging device 12B, an imaging device 12C, an imaging device 12D, and an imaging device 12E (hereafter, simply referred to as "imaging device(s) 12" in the case where there is no need to distinguish these devices).

The imaging device 12 is a device to capture an image. The imaging device 12 may be, for example, a camera.

The imaging device 12A is an imaging device (a backward camera, a rear camera, or a back view camera) to capture an image behind as viewed from the mobile object 1 (in a direction opposite to the traveling direction in normal time). The imaging device 12B is an imaging device (left side camera) to capture an image on the left side as viewed from the mobile object 1. The imaging device 12C is an imaging device (right side camera) to capture an image on the right side as viewed from the mobile object 1. The imaging device 12D and the imaging device 12E are imaging devices (forward cameras) to capture an image in front as viewed from the mobile object 1 (the traveling direction in normal time).

The imaging device 12 may be, for example, an advanced driver-assistance system (ADAS) to assist operations of the driver, or an imaging device to capture images for automatic driving. In addition, the imaging device 12 may be, for example, cameras to capture images (around view, panoramic view, multi view, top view) for an omnidirectional monitor that generates an image as if the mobile object 1 is viewed from directly above. In addition, the imaging device 12 may be, for example, an imaging device for a drive recorder to record an image of the outside or the like of the mobile object 1.

The imaging device 12A may be, for example, a camera to capture an image to be displayed on the rearview mirror monitor. In addition, the imaging device 12A may be, for example, a camera to capture an image to be displayed on a screen of the navigation device 18 when the mobile object 1 travels backward (goes back).

The imaging device 12B may be, for example, a camera to capture an image to be displayed on the left side mirror monitor. The imaging device 12C may be, for example, a camera to capture an image to be displayed on the right side mirror monitor.

In the example in FIG. 1, the imaging device 12D is provided on the front surface of the mobile object 1 (the front end surface in the case where the mobile object 1 moves forward). In addition, the imaging device 12E is provided in the interior being inside the windshield of the mobile object 1. In this case, the imaging device 12E may be provided, for example, in the vicinity of a rearview mirror in the interior, inside the windshield, on the dashboard, or the like.

Note that each of the imaging device 12D and the imaging device 12E to capture images in front as viewed from the mobile object 1 (the traveling direction in normal time) may be a stereo camera including multiple cameras. In addition, the mobile object 1 may include only one of the imaging device 12D and the imaging device 12E.

<Configuration of Mobile Object 1>

Figure 2:
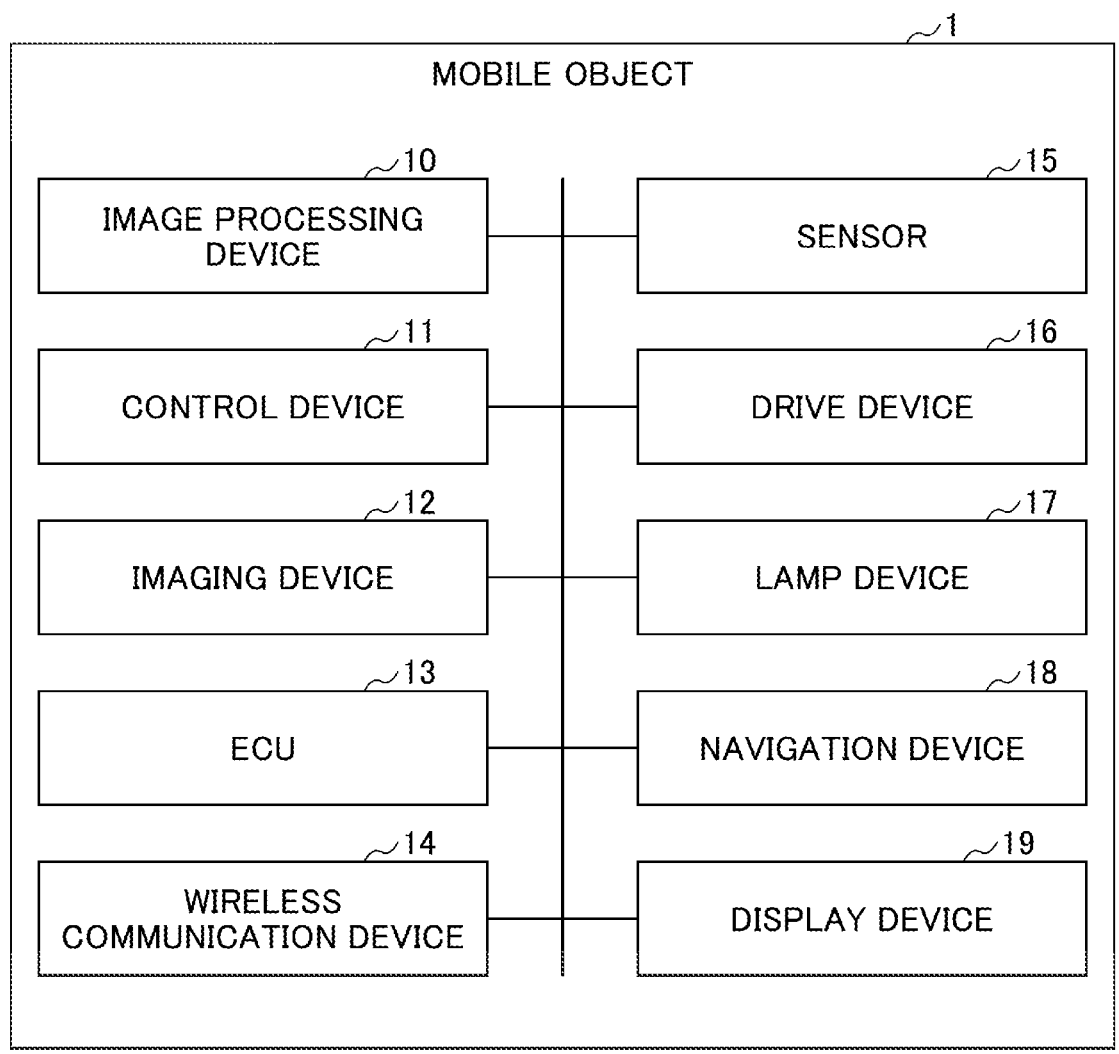
FIG. 2 is a diagram illustrating an example of a configuration of a mobile object according to the embodiment.

FIG. 2 is a diagram illustrating an example of a configuration of the mobile object 1 according to the embodiment. In the example in FIG. 2, the mobile object 1 includes an image processing device 10, a control device 11, an imaging device 12, an ECU 13, a wireless communication device 14, a sensor 15, a drive device 16, a lamp device 17, a navigation device 18, and a display device 19.

These devices are connected to each other by an internal network (e.g., an in-vehicle network) such as a controller area network (CAN) and Ethernet (registered trademark).

The image processing device 10 generates images whose brightness are corrected so as to reduce hunting, based on images (frames) captured at points in time by the imaging device 12. In addition, the image processing device 10 may record generated images in an external or internal recording device.

The control device 11 is a computer (information processing device) to control the respective components of the mobile object 1. Based on images generated by the image processing device 10, the control device 11 recognizes objects outside the mobile object 1. Note that the objects may include, for example, another vehicle, a pedestrian, a bicycle, a white line, a side wall of a road, an obstacle, and the like.

In addition, based on images at points in time generated by the image processing device 10, the control device 11 tracks recognized objects. The control device 11 controls the electronic control unit (ECU) 13 and the like of the mobile object 1, based on the detected objects (the recognized objects and the tracking objects), to control the movement or the like of the mobile object 1.

The control device 11 may control movement or the like of the mobile object 1, to implement automatic driving at any level from level 0 where a driver (user, driver, passenger) operates a main control system (acceleration, steering, braking, etc.) to level 5 where unmanned operations are executed.

The ECU 13 is a device to control the respective devices of the mobile object 1. Note that the ECU 13 may include multiple ECUs. The wireless communication device 14 communicates with a device outside the mobile object 1, such as the server 50 and a server on the Internet, by wireless communication through a mobile phone network or the like.

The sensors 15 are sensors to detect various types of information. The sensors 15 may include, for example, a position sensor for obtaining current positional information on the mobile object 1. Note that the position sensor may be, for example, a sensor using a satellite positioning system such as a global positioning system (GPS).

In addition, the sensors 15 may include a speed sensor to detect the speed of the mobile object 1. Note that the speed sensor may be, for example, a sensor to measure the number of revolutions of a wheel axle. In addition, the sensors 15 may include an acceleration sensor to detect an acceleration of the mobile object 1. In addition, the sensors 15 may include a yaw axis angular velocity sensor to detect the yaw axis angular velocity (yaw rate) of the mobile object 1.

In addition, the sensors 15 may include an operation sensor to detect an amount of operation or the like of the driver and the mobile object 1 by the control device 11. Note that the operation sensor may include, for example, an accelerator sensor to detect a depression amount of an accelerator pedal, a steering sensor to detect a rotation angle of a steering wheel, a brake sensor to detect a depression amount of a brake pedal, a shift position sensor to detect a position of a gear, and the like.

The drive device 16 includes various types of devices for travel of the mobile object 1. The drive device 16 may include, for example, an engine, a steering device (steering), a braking device (brake), and the like.

The lamp device 17 includes various types of lamps installed on the mobile object 1. The lamp device 17 may include, for example, a headlight (headlamp), a lamp of direction indicator (blinker) for indicating a direction to the surroundings when turning right or left or changing the lane (lane change), a backlight provided at a rear part of the mobile object 1 and turned on when the gear is in a reverse range, a brake lamp, and the like.

The navigation device 18 is a device (car navigation system) to guide a route to a destination by sound and display. Map information may be recorded on the navigation device 18. In addition, the navigation device 18 may transmit information on the current position of the mobile object 1 to an external server that provides a car navigation service, to obtain map information around the mobile object 1 from the external server. Note that the map information may include, for example, information on nodes indicating intersections or the like and links as road sections between the nodes.

The display device 19 displays an image or the like generated by the image processing device 10. When the mobile object 1 travels backward (goes backward), the display device 19 may display, for example, an image in which the backward direction or the like of the mobile object 1 is captured. Note that the display device 19 may display, for example, an image output from the navigation device 18.

<Hardware Configuration of Computer>

Figure 3:
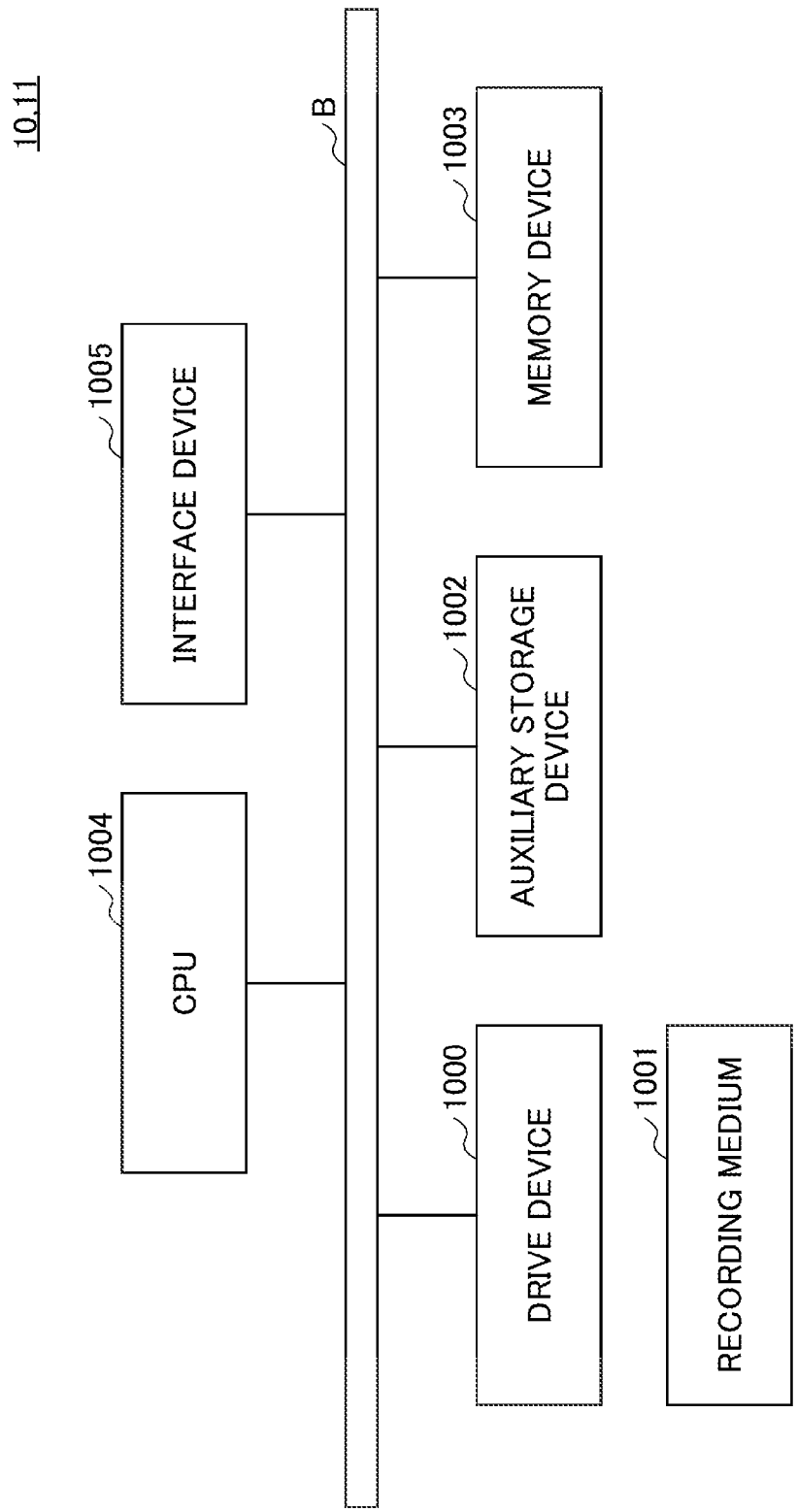
FIG. 3 is a diagram illustrating an example of a hardware configuration of an image processing device and a control device according to the embodiment.

FIG. 3 is a diagram illustrating an example of a hardware configuration of an image processing device 10 and a control device 11 according to the embodiment. In the following, the image processing device 10 will be described as an example. The hardware configuration of the control device 11 may be substantially the same as that of the image processing device 10.

In the example in FIG. 3, the image processing device 10 includes a drive device 1000, an auxiliary storage device 1002, a memory device 1003, a CPU 1004, an interface device 1005, and the like, which are connected to each other via a bus B.

An information processing program for implementing processes in the image processing device 10 is provided by a recording medium 1001. Once the recording medium 1001 on which the information processing program is recorded is set in the drive device 1000, the information processing program is installed from the recording medium 1001 to the auxiliary storage device 1002 via the drive device 1000. However, the information processing program is not necessarily installed from the recording medium 1001, and may be downloaded from another computer via a network. The auxiliary storage device 1002 stores the installed information processing program, and also stores necessary files, data, and the like.

The memory device 1003 reads and stores a program from the auxiliary storage device 1002 in response to a command to activate the program. The CPU 1004 executes processing according to a program stored in the memory device 1003. The interface device 1005 is used as an interface for connecting to a network.

Note that as an example of the recording medium 1001, a portable recording medium such as a CD-ROM, a DVD disk, a USB memory, or the like may be enumerated. In addition, as an example of the auxiliary storage device 1002, a hard disk drive (HDD), a flash memory, or the like may be enumerated. Both of the recording medium 1001 and the auxiliary storage device 1002 correspond to a computer-readable recording medium.

Note that the image processing device 10 may be implemented by, for example, an analog circuit or an integrated circuit such as an application specific integrated circuit (ASIC) or a field-programmable gate array (FPGA).

<Configurations of Image Processing Device 10 and Control Device 11>

Figure 4:
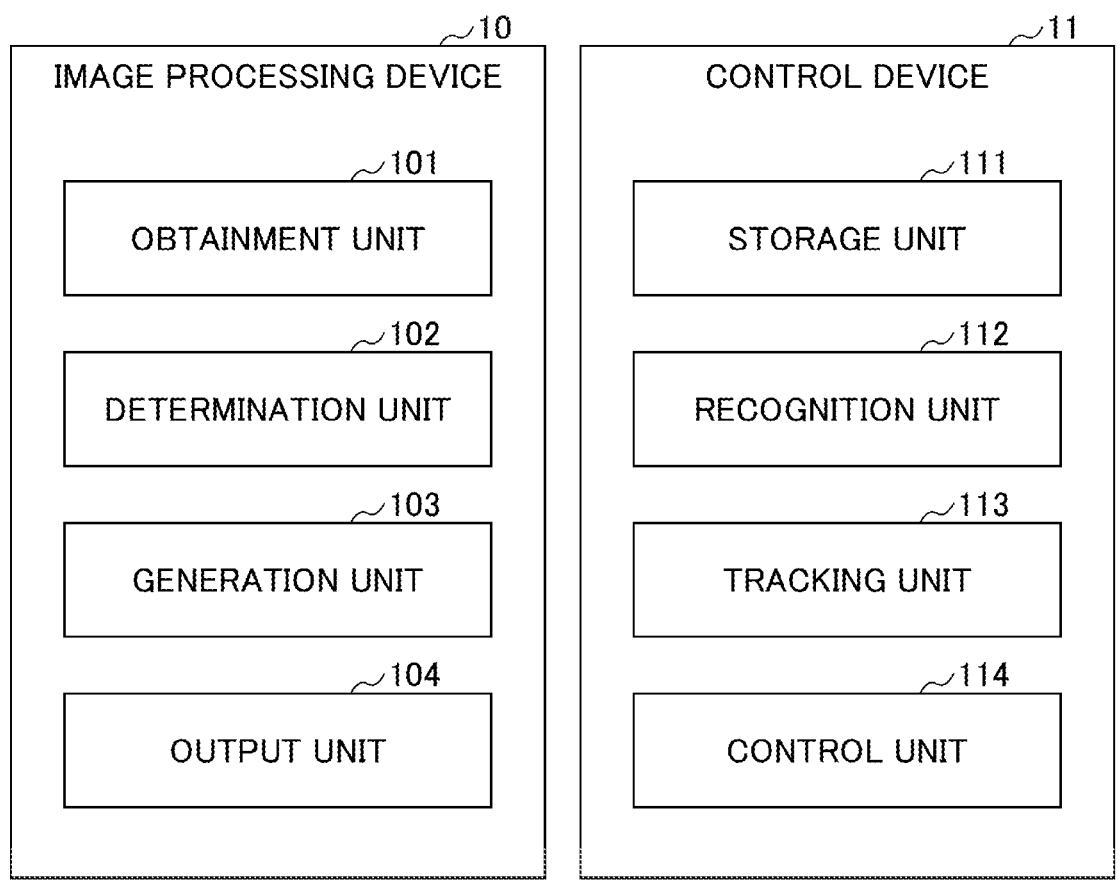
FIG. 4 is a diagram illustrating an example of a configuration of the image processing device and the control device according to the embodiment.

Next, with reference to FIG. 4, configurations of the image processing device 10 and the control device 11 will be described. FIG. 4 is a diagram illustrating an example of a configuration of an image processing device 10 and a control device 11 according to the embodiment.

<<Image Processing Device 10>>

The image processing device 10 includes an obtainment unit 101, a determination unit 102, a generation unit 103, and an output unit 104. Each of these units may be implemented by interoperation between one or more programs installed on the image processing device 10 and hardware such as the CPU 1004 and the like of the image processing device 10.

The obtainment unit 101 obtains data from another device. The obtainment unit 101 obtains, for example, an image captured by the imaging device 12 from the imaging device 12.

The determination unit 102 determines a correction amount of the brightness of an image, based on the brightness of a predetermined area (area for detecting halation, an example of "a first area") of the image obtained by the obtainment unit 101.

The generation unit 103 generates an image (corrected image or output image) in which the brightness of an area below the area for detecting halation in the vertical direction with respect to the traveling surface of the mobile object 1 is corrected according to the correction amount determined by the determination unit 102.

The output unit 104 outputs an image generated by the generation unit 103 to the display device 19, the control device 11, and the like.

<<Control Device 11>>

The control device 11 includes a storage unit 111, a recognition unit 112, a tracking unit 113, and a control unit 114. Each of these units may be implemented by interoperation between one or more programs installed on the control device 11 and hardware such as the CPU and the like of the control device 11.

The storage unit 111 stores various items of information. The storage unit 111 stores, for example, a trained model delivered by the server 50.

The recognition unit 112 recognizes an object captured in an image based on the trained model stored in the storage unit 111, an image output by the image processing device 10, and the like. The recognition unit 112 may recognize, for example, the type of the object and a relative position (distance) with respect to the mobile object 1. Note that the recognition unit 112 may classify objects into types such as a vehicle, a motorcycle, a bicycle, a person, and others.

The tracking unit 113 tracks objects recognized by the recognition unit 112, based on images output by the image processing device 10 at points in time, over the points in time.

The control unit 114 controls the mobile object 1, based on the distance between the mobile object 1 and each object tracked by the tracking unit 113.

<Processes>

Figure 5:
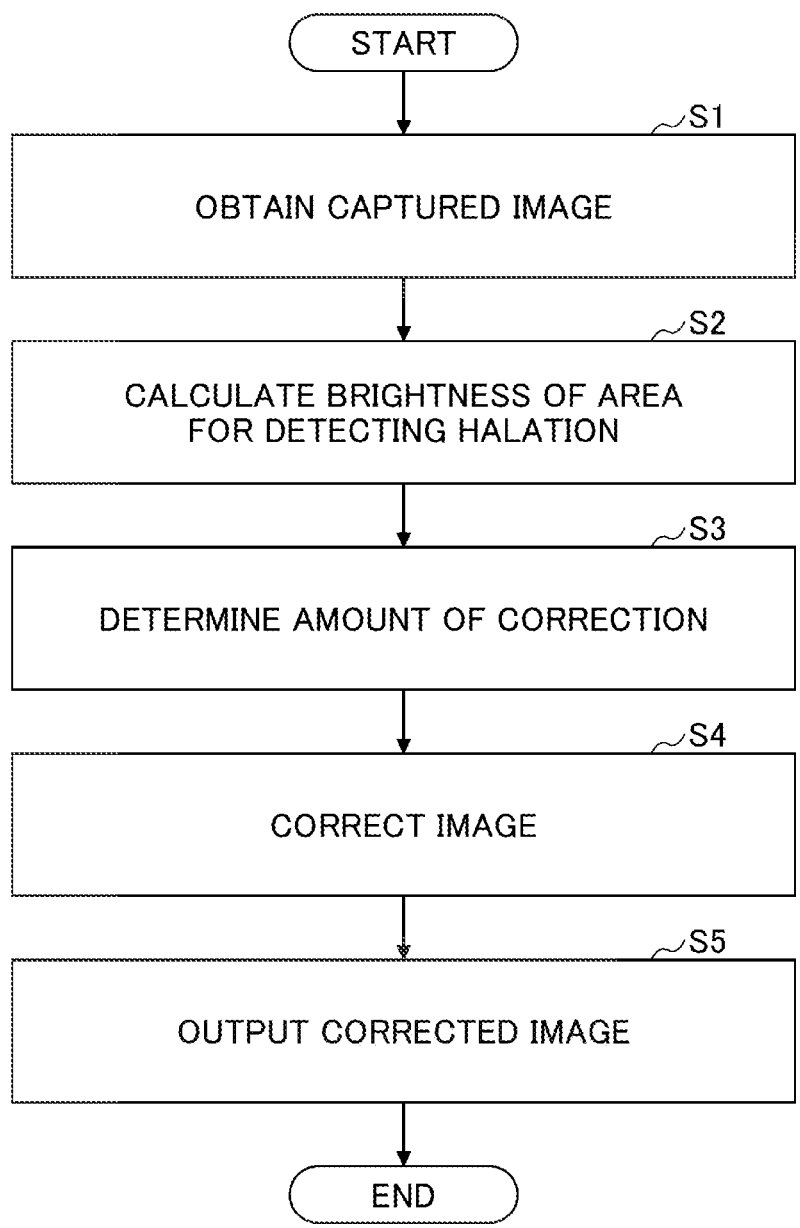
FIG. 5 is a flow chart illustrating an example of a correction process of an image executed by the image processing device according to the embodiment.
Figure 6:
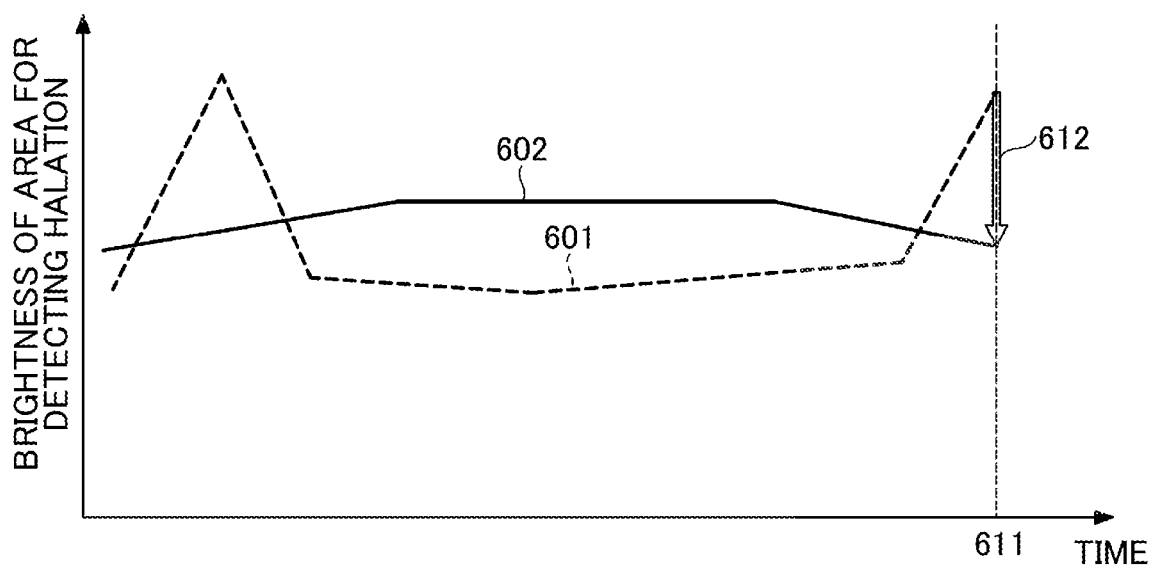
FIG. 6 is a diagram illustrating an example of a process of calculating a target value of brightness of a current frame to be processed according to the embodiment.
Figure 7:
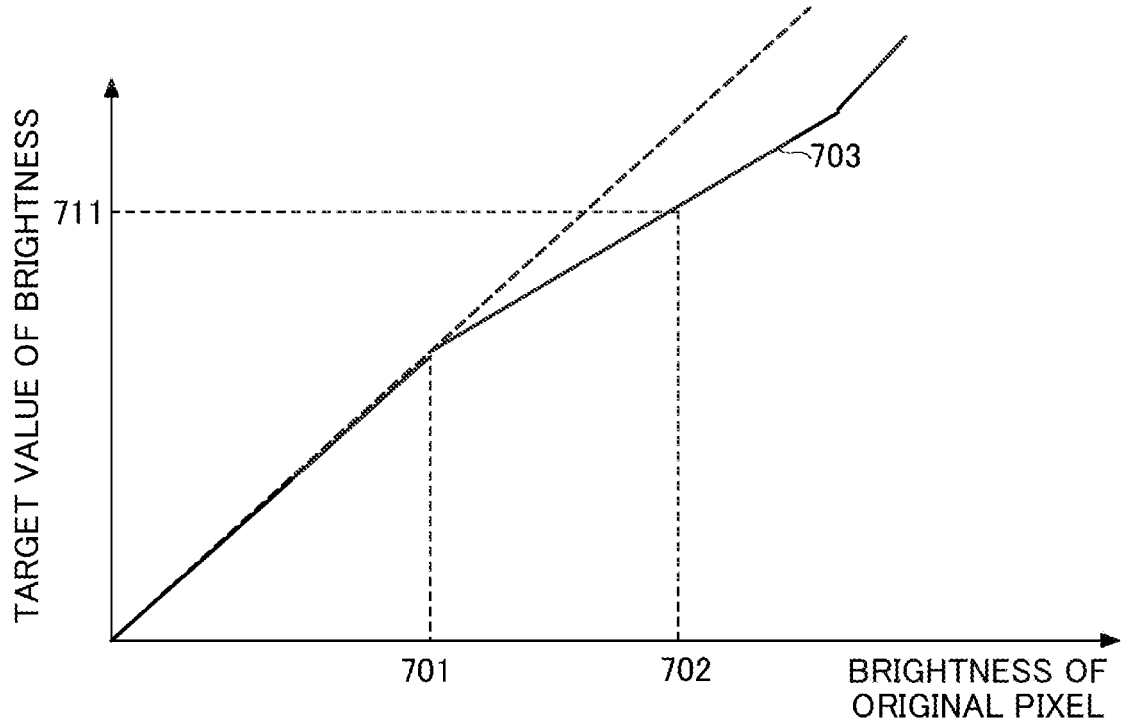
FIG. 7 is a diagram illustrating an example of a process of adjusting a correction amount according to the brightness of a pixel according to the embodiment.
Figure 8:
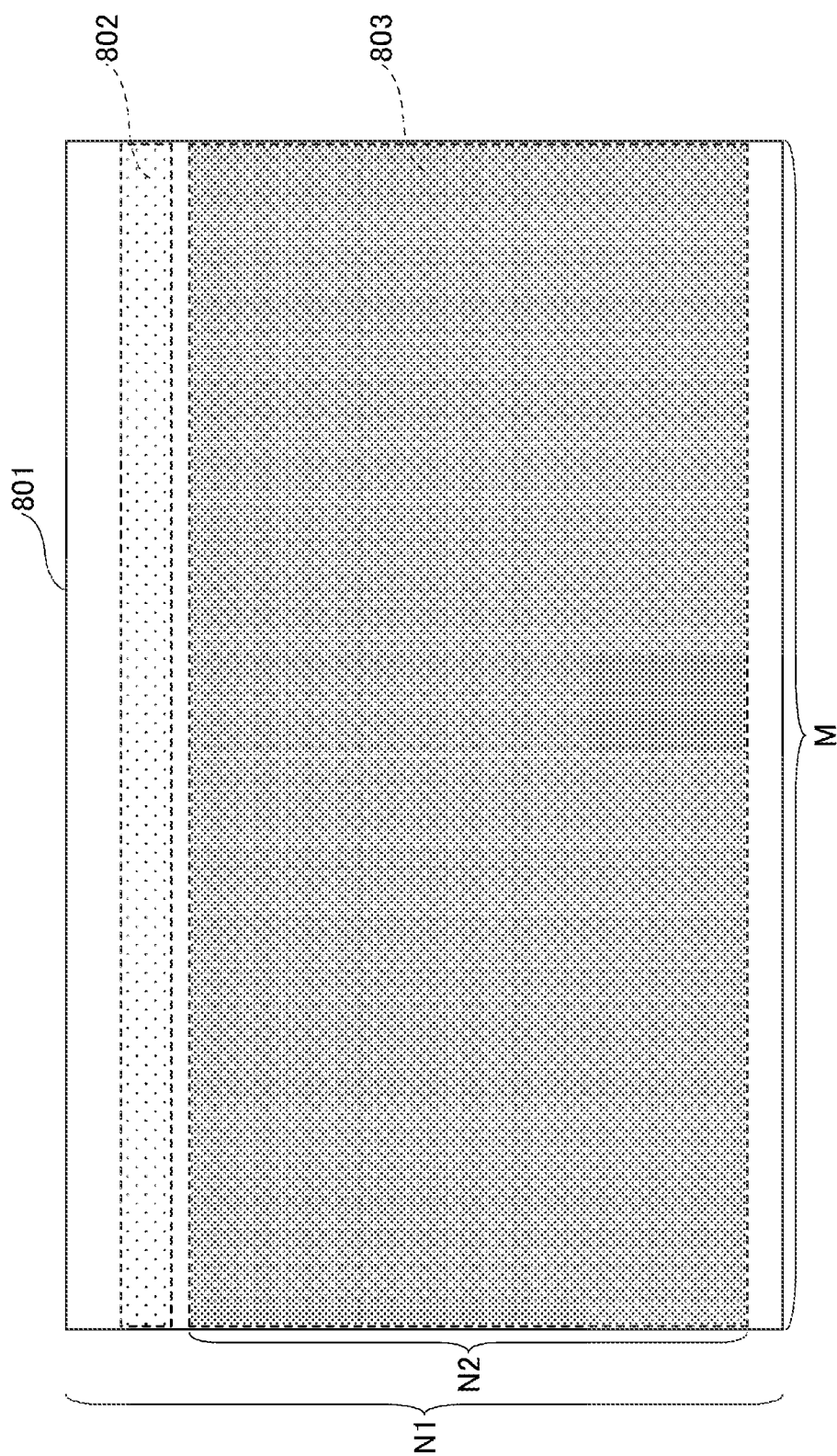
FIG. 8 is a diagram illustrating an example of an area for detecting halation according to the embodiment.
Figure 9:
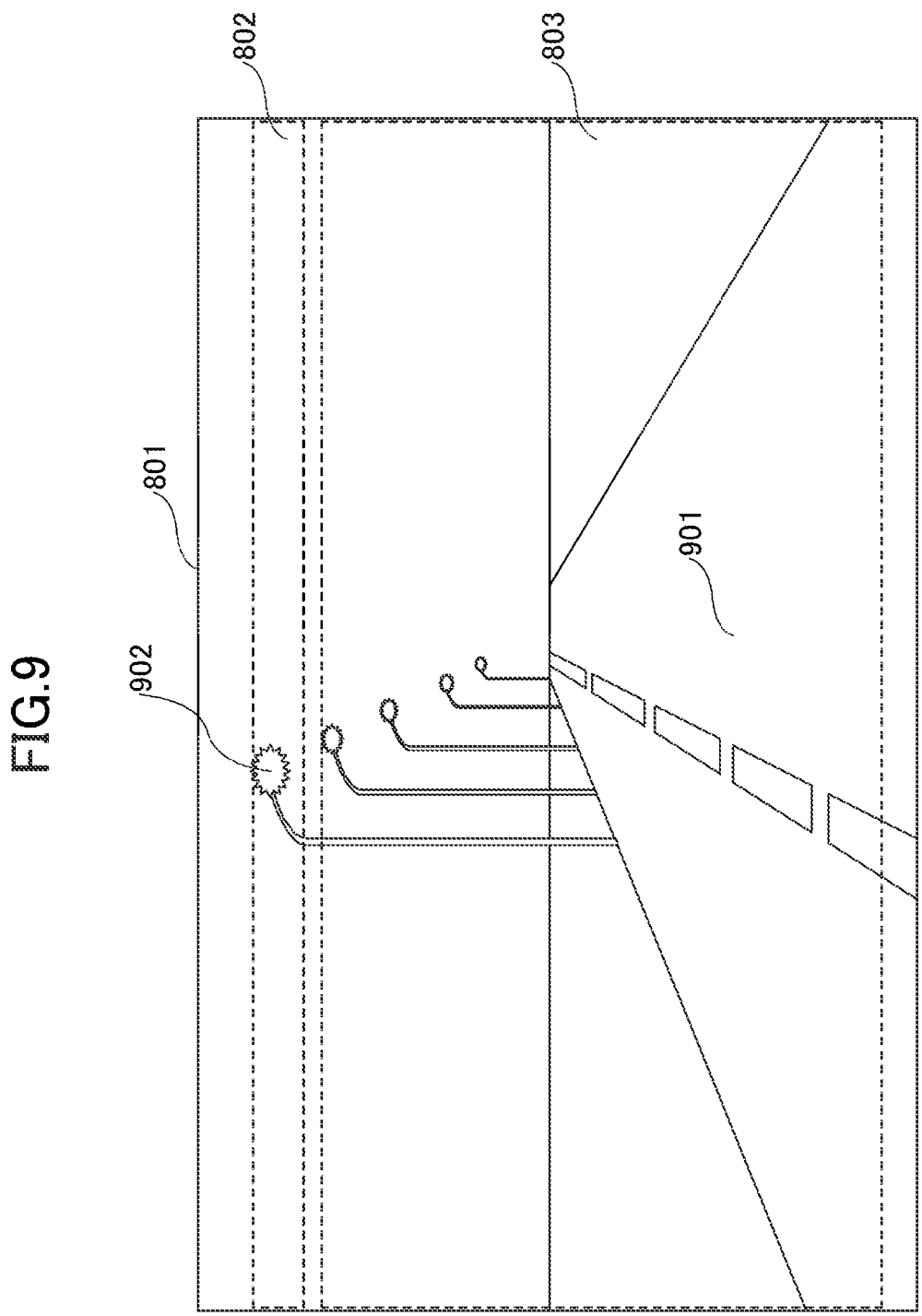
FIG. 9 is a diagram illustrating an example of an output image according to the embodiment.

Next, with reference to FIGS. 5 to 9, image correction processes executed on the image processing device 10 will be described. FIG. 5 is a flow chart illustrating an example of a correction process of an image executed by the image processing device 10 according to the embodiment. FIG. 6 is a diagram illustrating an example of a process of calculating a target value of brightness of a current frame to be processed according to the embodiment. FIG. 7 is a diagram illustrating an example of a process of adjusting the correction amount according to the brightness of a pixel according to the embodiment. FIG. 8 is a diagram illustrating an example of an area for detecting halation according to the embodiment. FIG. 9 is a diagram illustrating an example of an output image according to the embodiment.

Note that the following processes may be executed, for example, each time an image (frame) is captured by the imaging device 12. In this case, for example, in the case where images (frames) are captured 60 times (60 fps) per second by the imaging device 12, the following processes are executed 60 times per second.

At Step S1, the obtainment unit 101 of the image processing device 10 obtains an image (hereafter also referred to as a "current frame to be processed" as appropriate) captured by the imaging device 12. Here, the image processing device 10 obtains an image having a screen resolution of N1×M in which the number of horizontal pixels is N1 and the number of vertical pixels is M. In this case, the image processing device 10 may obtain an image, for example, in WUXGA (Wide Ultra-XGA) having a screen resolution of 1920×1200.

Next, the determination unit 102 of the image processing device 10 calculates the brightness of the predetermined area (area for detecting halation) in the image (Step S2). The area for detecting halation is, for example, an area in which halation occurs when a light source such as a street lamp is captured in the area for detecting halation. Note that the area for detecting halation may be set in advance when the image processing device 10 is installed on the mobile object 1 upon shipment. The area for detecting halation may be set, for example, according to the type of the mobile object 1 (e.g., the type of vehicle model). Accordingly, for example, in the case where halation (flare or ghost) occurs due to re-reflection on the inner surface of the windshield of the mobile object 1, the area for detecting halation can be set according to the shape and material of the windshield for each vehicle type and the like; the attachment position of the imaging device 12E and the like; and the like. Note that in the example in FIGS. 8 and 9, the area for detecting halation 802 is set in an upper area in the vertical direction with respect to the traveling surface of the mobile object 1. The number of vertical pixels of the area for detecting halation 802 may be, for example, a predetermined percentage (e.g., 5%) of the number of vertical pixels of the input image. In addition, the number of horizontal pixels of the area for detecting halation 802 may be, for example, the same as the number of horizontal pixels of the input image.

Here, the image processing device 10 may calculate a representative value among values of the pixels included in the area for detecting halation as the brightness of the area for detecting halation. In this case, the image processing device 10 may use an average, a median, or a mode (a peak of an appearance frequency in a histogram of pixel values) as the representative value. Note that the value of each pixel may be, for example, a total value of the values of bits of RGB.

In addition, the image processing device 10 may calculate the maximum value of values of the pixels included in the area for detecting halation as the brightness of the area for detecting halation. In addition, the image processing device 10 may calculate the total value of the values of the pixels included in the area for detecting halation as the brightness of the area for detecting halation.

Next, the determination unit 102 of the image processing device 10 determines a correction amount of brightness for the current frame to be processed, based on the brightness of the area for detecting halation of the current frame to be processed (Step S3). Here, the image processing device 10 may determine the correction amount of brightness for the current frame to be processed so as to reduce variation in brightness between previously obtained frames and the current frame to be processed.

In this case, for example, the image processing device 10 may calculate a target value of the brightness for the current frame to be processed by a predetermined filter function, based on the brightness of the area for detecting halation in frames obtained within a predetermined period up to the present (e.g., within the latest one second). In addition, the image processing device 10 may take the value of a ratio of the target value to the brightness of the area for detecting halation of the current frame to be processed, as a coefficient for correction.

In this case, the image processing device 10 may use a finite impulse response filter (FIR) as the predetermined filter function, to calculate a moving average of the brightness for the current frame to be processed. In addition, the image processing device 10 may set the value of the moving average for the current frame to be processed as the target value, to calculate the value of a ratio of the target value to the brightness of the area for detecting halation in the current frame to be processed, as the coefficient for correction. In addition, the image processing device 10 may use an infinite impulse response filter (IIR) as the predetermined filter function.

In the example in FIG. 6, a transition 601 of brightness of the area for detecting halation in frames obtained (captured) at points in time, and target values (e.g., a moving average) 602 calculated using a predetermined filter function are illustrated. In addition, a time (current time) 611 at which the current frame to be processed was obtained (captured) and a correction amount of brightness 612 for the current frame to be processed are illustrated. Note that the correction amount 612 is a difference between the original brightness of the current frame to be processed and the target value for the current frame to be processed.

In addition, as illustrated in FIG. 7, the image processing device 10 may adjust the value of the coefficient for correction of the target value for each pixel in the current frame to be processed according to the brightness of the pixel. In the example in FIG. 7, the image processing device 10 does not correct a pixel value whose brightness is lower than a threshold value 701, and determines an adjusted coefficient for correction 703 so as to make the coefficient for correction become greater as the brightness becomes greater for a pixel value whose brightness is equal to or higher than the threshold value 701. Accordingly, for example, the correction amount of the brightness in a dark area in the current frame to be processed can be reduced.

In the example in FIG. 7, the value of the coefficient for correction for pixel values whose brightness is less than the threshold value 701 is 1. In addition, the coefficient for correction in the case of the brightness being equal to the brightness of the area for detecting halation is set to the value of a ratio of a target value 711 to the brightness of the area for detecting halation of the current frame to be processed.

In addition, the image processing device 10 may determine the value of the coefficient for correction according to the distance from the area for detecting halation for each area (an example of a "third area") of the area included in the corrected image in the current frame to be processed. In this case, the image processing device 10 may determine the coefficient for correction so as to make the coefficient for correction greater as the distance in pixels from the area for detecting halation becomes closer (the number of pixels in-between becomes smaller). Accordingly, for example, in the current frame to be processed, the correction amount of brightness can be reduced for an area distant from the area for detecting halation, which is considered to be less affected by halation.

In this case, for example, the image processing device 10 may divide an area included in the corrected image in the current frame to be processed into a predetermined number (e.g., three) of areas in the horizontal direction, to set the value of the coefficient for correction in the lowermost area to 1 (no correction). In addition, the value of the coefficient for correction in an intermediate area may be set to be closer to 1 than the value of the coefficient for correction in the uppermost area.

Next, the generation unit 103 of the image processing device 10 generates an image (corrected image or output image) whose brightness is corrected according to the correction amount determined by the determination unit 102 based on the current frame to be processed (Step S4). Here, the image processing device 10 may generate the corrected image by updating the pixel value of each pixel in an area included in the corrected image in the current frame to be processed, with a value obtained by multiplying the pixel value by the coefficient for correction.

The image processing device 10 may execute correction on only a rectangular area not including the area for detecting halation in the current frame to be processed, to generate a corrected image including only the area. Accordingly, as the correction process is not applied to every pixel in the area for detecting halation, the processing speed can be improved. In this case, as illustrated in FIG. 8, the image processing device 10 corrects an N2×M area 803 where the number of horizontal pixels is N2 and the number of vertical pixels is M, excluding an area for detecting halation 802 in an entire area 801 of the current frame to be processed (input image) having a screen resolution of N1×M, to generate the corrected area 803 as a corrected image (output image). In this case, the image processing device 10 may generate an image, for example, in FHD (Full-HD) having a screen resolution of 1920×1080.

Note that as illustrated in FIG. 8, the area 803 included in the corrected image in the current frame to be processed is positioned below the area for detecting halation in the vertical direction (vertical direction in the case of the mobile object 1 being a vehicle or the like) with respect to a traveling surface (e.g., a road surface) of the mobile object 1.

Next, the output unit 104 of the image processing device 10 outputs the image generated by the generation unit 103 (Step S5). In the example in FIG. 9, when the mobile object 1 is traveling on a road 901, a street light 902 is present in an obliquely upward direction of the mobile object 1; therefore, the street light 902 is captured in the area for detecting halation 802 of the image captured by the imaging device 12. In this case, by the process from Step S1 to Step S5 described above, the area 803 is corrected and output as a corrected image. Note that, in the entire area 801 in FIG. 8, although there are areas in which the area for detecting halation 802 and the area 803 are not arranged, it may be assumed that such areas are not provided. In addition, the ends of the area for detecting halation 802 and the area 803 may be arranged to reach the ends of the entire area 801, or the area for detecting halation 802 and the area 803 may be arranged without a gap therebetween.

(Imaging Device 12)

Figure 10A:
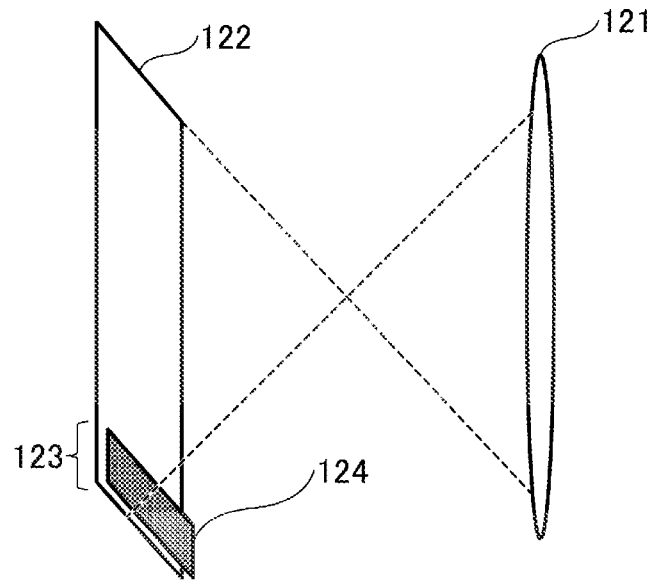
FIG. 10A is a diagram illustrating an example of a configuration of the imaging device according to the embodiment.
Figure 10B:
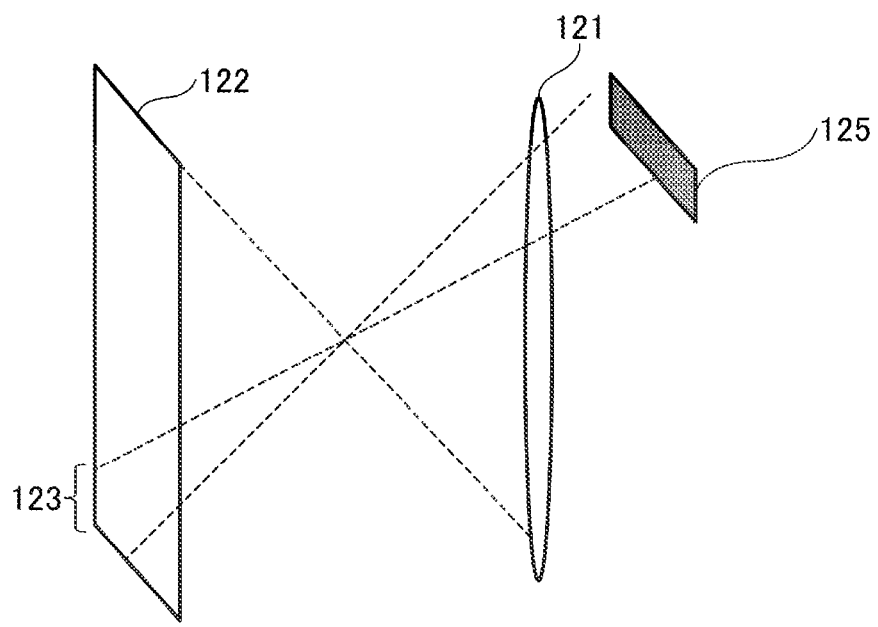
FIG. 10B is a diagram illustrating an example of a configuration of the imaging device according to the embodiment.
Figure 10C:
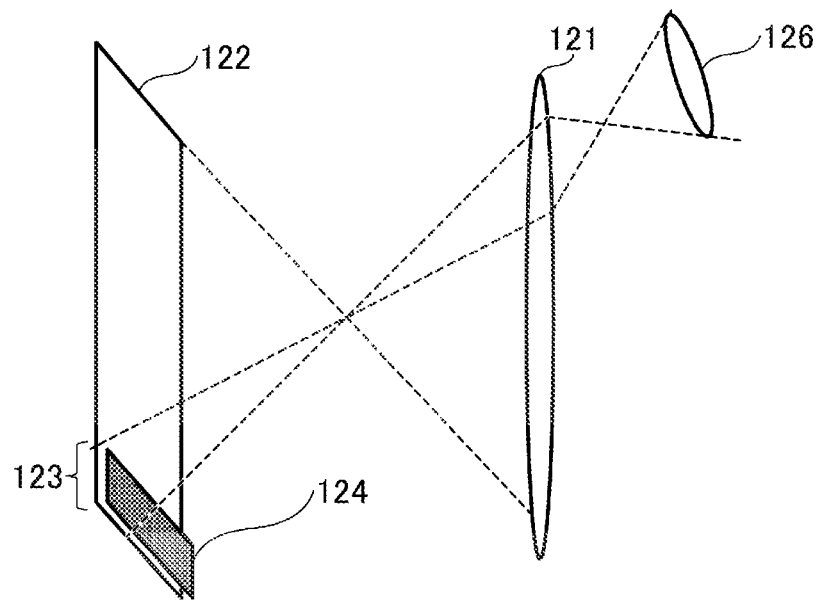
FIG. 10C is a diagram illustrating an example of a configuration of the imaging device according to the embodiment.

Next, with reference to FIGS. 10A to 10C, examples of configurations of the imaging device according to the embodiment will be described. FIGS. 10A to 10C are diagrams illustrating examples of configurations of the imaging device according to the embodiment.

The imaging device 12 may include a mechanism to diffuse light from a light source such as a street lamp captured in the area for detecting halation, upon capturing an image. Accordingly, for example, even if the pixel value of a pixel to capture light from a light source such as a street lamp would exceed a dynamic range (a range of light that can be exposed) without the mechanism, the light can be diffused by the mechanism, and thereby, each pixel value can be set to be less than or equal to the dynamic range. Therefore, more appropriate correction can be executed by the process from Step S1 to Step S5 in FIG. 5 described above.

In this case, as illustrated in FIG. 10A, the imaging device 12 may include a diffusion plate 124 in front of a part that images the area for detecting halation 123 in the sensor surface of an image sensor 122 that converts light incident from a lens 121 into an electric signal. Note that the diffusion plate 124 is a member to diffuse light, and, for example, may have irregularities provided on a surface of a substrate made of glass, acrylic, film, or the like.

Note that in the example in FIG. 10A, light incident from the lens 121 is vertically inverted by the lens 121; therefore, the part that images the area for detecting halation 123 is positioned below the sensor surface of the image sensor (imaging element) 122.

Alternatively, as illustrated in FIG. 10B, the imaging device 12 may include a diffusion plate 125 in front of the lens 121, at a position through which light incident on the area for detecting halation 123 from the lens 121 passes. Note that the diffusion plate 125 is a member to diffuse light, and may have irregularities provided on a surface of a substrate made of glass, acrylic, film, or the like.

Alternatively, as illustrated in FIG. 10C, the imaging device 12 may include a wide-angle lens 126 to collect light incident on the area for detecting halation 123 from the lens 121 at a wide angle, in front of the lens 121.

Note that the imaging device 12 may be a general imaging device that does not include the light diffusion glass or the like described above. In this case, the mobile object 1 may use an imaging device that includes an image sensor having a high dynamic range (e.g., 24 bits) as the imaging device 12.

In addition, the image processing device 10 may cause the imaging device 12 that includes an image sensor having a lower dynamic range (e.g., 12 bits) to capture multiple frames while changing the exposure, and synthesize these frames to generate a frame having a higher dynamic range as an input image.

(Example Implemented with Analog Circuit)

Figure 11:
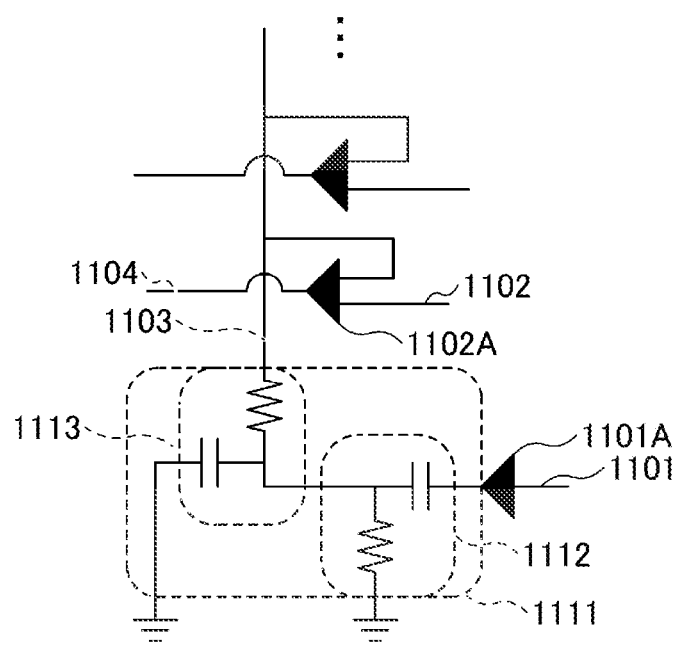
FIG. 11 is a diagram illustrating an example in a case of implementing the image processing device according to the embodiment by an analog circuit.

At least part of processing executed by the respective functional units of the image processing device may be executed by, for example, an analog circuit. FIG. 11 is a diagram illustrating an example of the case of implementing the image processing device 10 according to the embodiment by an analog circuit. In the example in FIG. 11, the image processing device 10 includes a wire 1101, an amplifier circuit 1101A, a determination circuit 1111, a wire 1102, an amplifier circuit 1102A, a wire 1103, and a wire 1104. In addition, the determination circuit 1111 includes a differentiation circuit 1112 and an integration circuit 1113.

In the example in FIG. 11, a signal from an imaging element that captures an image of the area for detecting halation 123 on the sensor surface of the image sensor 122 is input into the determination circuit 1111 via the wire 1101 and the amplifier circuit 1101A (e.g., a line amplifier). In the determination circuit 1111, the differentiation circuit 1112 detects change in time in brightness, and the integration circuit 1113 (low-pass filter) blocks low-frequency components in the change in brightness.

In addition, signals from imaging elements that capture an image of an area (e.g., the area 803 in FIG. 8) other than the area for detecting halation 123 on the sensor surface of the image sensor 122 are output via one or more wires 1102 and amplifier circuits 1102A (e.g., line amplifiers).

In addition, a control signal (feedback current) based on a signal from the imaging element in the area for detecting halation 123 is input into the amplifier circuit 1102A from the determination circuit 1111 via the wire 1103. The amplifier circuit 1102A adjusts the amplification of the output of the imaging elements in the area other than the area for detecting halation 123 based on the signal (e.g., change in time in current value) from the imaging element in the area for detecting halation 123. More specifically, in the case where halation occurs in the area for detecting halation 123, the feedback current input to the amplifier circuit 1102A varies, the amplification amount in the amplifier circuit 1102A varies based on the variation, and thereby, the brightness of the output image is reduced. Accordingly, occurrences of halation can be suppressed.

Modified Example

The respective functional units of the image processing device 10 and the control device 11 may be implemented, for example, by cloud computing provided by one or more computers. In addition, the image processing device 10 and the control device 11 may be configured as an integrated device. In addition, the image processing device 10 and the imaging device 12 may be configured as an integrated device. In addition, a configuration may be adopted in which various processes of the image processing device 10 are executed by the server 50. In addition, the mobile object 1 includes one semiconductor device, and the image processing device 10 and the control device 11 may be included in the one semiconductor device. In addition, the mobile object 1 may include multiple semiconductor devices, to have the image processing device 10 included in one of the semiconductor devices, and have the control device 11 included in another of the semiconductor devices.

Effects of Present Disclosure

Conventionally, when the mobile object 1 travels under a street lamp at night or the like, in some cases, halation (flare or ghost) occurs due to re-reflection or the like on a glass of the housing of the mobile object 1 such as a windshield and a lens of the imaging device 12.

According to the present disclosure, the brightness of frames can be corrected appropriately. Therefore, for example, when a moving image constituted with multiple frames is displayed on an omnidirectional monitor, a back monitor, or the like, fluctuation of brightness due to halation (hunting) can be reduced. In addition, for example, it is considered that the detection accuracy of an object based on an image can be improved by reducing ghost or the like.

In addition, in the case where the correction amount is determined based on an entire frame, conventionally, it has been necessary to calculate the brightness of the entire frame. Further, if conventionally configured, the image processing device 10 would not execute processing on the current frame to be processed until the pixel values of all pixels of the frame are input from the imaging device 12 and stored in the memory.

In contrast, according to the present techniques in the present disclosure, the correction amount is determined based on only pixels of an area for detecting halation among all pixels of the frame; therefore, a correction process can be executed at a higher speed (lower latency) compared to the case of determining the correction amount based on the entire frame.

As above, the embodiments of the present invention have been described in detail; note that the present invention is not limited to such specific embodiments, and various modifications and changes can be made within the scope of the gist of the present invention described in the claims.

What is claimed is:

1. An image processing device comprising:
a memory; and
a processor configured to execute
obtaining a first image captured by an imaging device installed on a mobile object, the first image including a first area set based on an attachment position of the imaging device on the mobile object and a second area located below the first area in a vertical direction with respect to a traveling surface of the mobile object;
generating, from the first image, a second image in which brightness of the second area is corrected based on brightness of the first area, wherein the brightness of the first area is not corrected; and
outputting the second image.

2. The image processing device as claimed in claim 1, wherein the generating generates the second image including the second area and not including the first area.

3. The image processing device as claimed in claim 1, wherein the generating corrects brightness of each pixel included in the second area, based on the brightness of said each pixel.

4. The image processing device as claimed in claim 1, wherein the generating corrects brightness of a third area included in the second area based on a distance from the first area to the third area.

5. The image processing device as claimed in claim 1, wherein the first area is imaged by the imaging device through a diffusion plate.

6. An image processing method executed by an image processing device, the image processing method comprising:
obtaining a first image captured by an imaging device installed on a mobile object, the first image including a first area set based on an attachment position of the imaging device on the mobile object and a second area located below the first area in a vertical direction with respect to a traveling surface of the mobile object;
generating, from the first image, a second image in which brightness of the second area is corrected based on brightness of the first area, wherein the brightness of the first area is not corrected; and
outputting the second image.

7. A non-transitory computer-readable recording medium having computer-readable instructions stored thereon, which when executed, cause an image processing device including a memory and a processor to execute a process comprising:

obtaining a first image captured by an imaging device installed on a mobile object, the first image including a first area set based on an attachment position of the imaging device on the mobile object and a second area located below the first area in a vertical direction with respect to a traveling surface of the mobile object;

generating, from the first image, a second image in which brightness of the second area is corrected based on brightness of the first area, wherein the brightness of the first area is not corrected; and outputting the second image.

\* \* \* \* \*